A. McDONALD.
Finger-Nail Cutter.

No. 218,391. Patented Aug 12, 1879.

Witnesses:
Henry Chadbourn
F. C. Torrey

Inventor:
Alexander McDonald
by Alban Andrew
his atty.

UNITED STATES PATENT OFFICE.

ALEXANDER McDONALD, OF WORCESTER, MASSACHUSETTS.

IMPROVEMENT IN FINGER-NAIL CUTTERS.

Specification forming part of Letters Patent No. 218,391, dated August 12, 1879; application filed June 16, 1879.

*To all whom it may concern:*

Be it known that I, ALEXANDER McDONALD, of Worcester, in the county of Worcester and State of Massachusetts, have invented certain new and useful Improvements in Finger-Nail Cutters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements on the patent for finger-nail cutters granted to Richard W. Stewart on May 22, 1877, No. 190,989; and consists, in combination with the cutter, as shown in said patent, of a handle forming a pair of tweezers, by the combination of which I obtain a very compact, neat, and convenient finger-nail tool, for the toilet or pocket use, to which is added, if preferred, a nail-cleaner, as will now be more fully shown and described.

Figure 1:
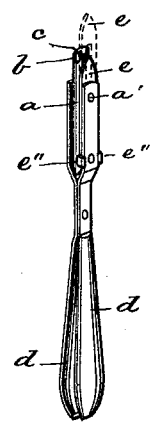
Figure 4:
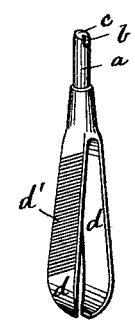
Figure 2:
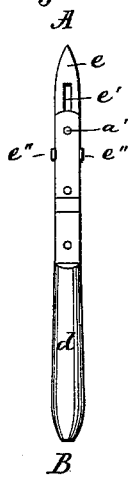
Figure 3:
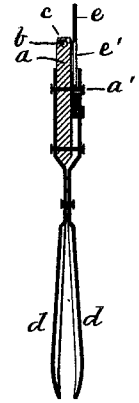

On the accompanying drawings, Figure 1 represents a perspective view of my improved finger-nail tool. Fig. 2 represents a side elevation of the same. Fig. 3 represents a central longitudinal section on the line A B, shown in Fig. 2. Fig. 4 represents a modification of the same.

Similar letters refer to similar parts wherever they occur on the different parts of the drawings.

$a$ is the shank of the finger-nail cutter, provided in its upper end with a hole or aperture, $b$, and cutting-edge $c$, made in conformity with the Stewart patent aforesaid. $d\ d$ represent the handle of said finger-nail-cutting tool, which handle is split, so as to serve as a pair of tweezers, as shown in the accompanying drawings.

One or both of said tweezers $d\ d$ may be serrated, as shown in Fig. 4, so as to serve as a finger-nail file. In Fig. 4 the tweezers $d\ d$ are shown as being soldered or made in one piece with the finger-nail cutter $a\ b\ c$, whereas in Figs. 1, 2, and 3 they are shown as being made in separate parts and riveted to the finger-nail cutter $a\ b\ c$, either construction of which is practical; and I wish to state that I do not confine myself to any particular manner of attaching the tweezers $d\ d$ to the shank $a$.

In Figs. 1, 2, and 3, $e$ represents a finger-nail cleaner, arranged so as to slide up and down on one side of the cutter-bar $a$, the said cleaner being for this purpose provided with a slot-hole, $e'$, through which the rivet $a'$ projects, which rivet also serves for the purpose of securing the cutter-bar $a$ to the upper forked ends of the tweezers $d\ d$.

$e''\ e''$ are projections or lips on the cleaner $e$, that serve as guides for the latter in its up-and-down motion on the side of one of the tweezer-shanks.

In Fig. 1 the cleaner $e$ is shown as pushed down to its lowest position in relation to the cutter-bar $a$. The dotted lines in said figure show the position of the said cleaner as pushed out to its whole extent when required for use. Figs. 2 and 3 show the cleaner $e$ as pushed out to its full extent.

The outside of the tweezers $d\ d$ may be provided with a serrated file-surface, $d'$, as shown in Fig. 4, to serve as a finger-nail file.

What I wish to secure by Letters Patent and claim is—

1. As a new article of manufacture, the herein-described finger-nail tool, consisting of the nail-cutter $a\ b\ c$ and its split tweezers $d\ d$, serving the double purpose of a handle and tweezers, as and for the purpose set forth.

2. As a new article of manufacture, the herein-described finger-nail tool, consisting of the nail-cutter $a\ b\ c$, split tweezers $d\ d$, serving the double purpose of a handle and tweezers, and a cleaner, $e$, as and for the purpose set forth.

In testimony that I claim the foregoing as my own invention I have affixed my signature in presence of two witnesses.

ALEXANDER McDONALD.

Witnesses:
ALBAN ANDRÉN,
HENRY CHADBOURN.